June 11, 1968     A. RAVVE ET AL     3,388,084
PREPARATION OF ISANO OIL-PHENOL PRODUCTS
Filed May 8, 1962
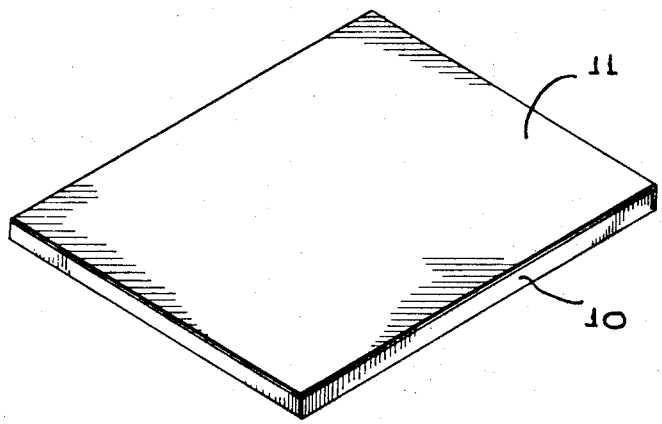
INVENTORS
ABRAHAM RAVVE
& CHESTER W. FITKO
BY *Mason, Porter, Diller & Stewart,*
ATTORNEYS

United States Patent Office 3,388,084
Patented June 11, 1968

3,388,084
PREPARATION OF ISANO OIL:PHENOL PRODUCTS
Abraham Ravve and Chester W. Fitko, Chicago, Ill., assignors to Continental Can Company, Inc., New York, N.Y., a corporation of New York
Filed May 8, 1962, Ser. No. 193,179
5 Claims. (Cl. 260—19)

This invention relates to the preparation of addition products from phenol and isano oil, and the production of thermoset condensation resins therefrom.

Isano oil is essentially composed of glyceride triesters. Analyses of commercial isano oil indicates the presence of isanic and isanolic acids in the proportion of about 46 and 44 percent. The general structure of isanic acid (Steger and Loon, Rec. Trav. Chim., vol. 59, page 1156, of 1940) is given as:

$$H_2C=CH-(C)_2)_4-C\equiv C-C\equiv C-(CH_2)_7-COOH$$

The structure for isanolic acid is:

$$H_3C-(CH_2)_2-CH=CH-C\equiv C-C$$
$$\equiv C-CH_2-CH(OH)-(CH_2)_6-COOH$$

It has been found that the isano oil can be caused to combine with phenol by action at the acetylenic links of the fatty acid chains, in the presence of zinc, cadmium and tin salts, to yield from isanic the acid complex of a compound of the general structure:

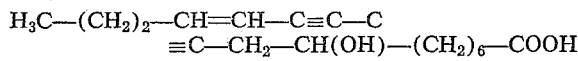
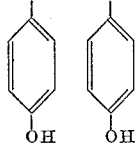

and from isanolic acid complex one of the general structure:

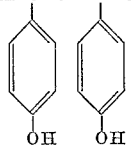

each therein shown as having the terminal —COOH group of the respective acid as such. The oils have a terminal —COOR, where R is the glycerol moiety.

Such reactions can be carried out by heating the phenol, isano oil and catalyst at 140 to 165 degrees C. for several hours; a viscous dark oily product forms which, after removal of catalyst and impurities, responds to infra-red spectroscopy as having the indicated structures.

The adduct as such may either be condensed with formaldehyde to form a resole, or it may be combined with other resoles: when so compounded, used for coating purposes, and baked, the material thermosets to form a cross-linked, three dimensional, internally plasticized film. Such resole can be the phenolic resin reaction product of a phenol with formaldehyde.

Aliphatic unsaturation remaining in the phenol-isano oil condensate may be further modified for coating composition, e.g. by:

(a) Hydrogenating in the presence of a conventional hydrogenation catalyst that will not reduce the phenyl ring;

(b) halogenating, e.g. by bubbling dry chlorine gas therethrough;

(c) hydrohalogenating, e.g. by bubbling dry hydrogen chloride gas therewith.

The adducts therefrom exhibit phenol groups which can be reacted with formaldehyde, catalyzed with a tertiary amine catalyst in order not to affect the ester links, and thus yields resoles which can be made up with volatile organic solvents, employed as metal coating lacquers and enamels, and baked for advancing the resole to resite or thermoset condition.

The three types of thermoset preparations exhibited satisfactory properties upon metal, from the standpoints of adhesion, flexibility and surface protection against acid and alkaline foodstuffs, fats, and other foodstuff components.

Illustrative practices are:

Example I

One hundred grams of isano oil were combined with 94 grams of phenol and five grams of anhydrous zinc chloride. The mixture was heated, while stirring, at 160° C. for five hours. The brown product was cooled, diluted to about 50% solids with toluene and washed four times with warm water to remove the zinc chloride catalyst. The toluene, water and unreacted phenol were removed by distilling under vacuum up to 120° C.

To the above product was added 40 milliliters of methyl formcel (55%) and 20 milliliters of triethylamine. Methyl formcel comprises a mixture of methyl dioxymethylene hemiacetal and methyl formaldehyde hemiacetal, as shown by J. F. Walker, "Formaldehyde," page 202, Second edition, Reinhold Publishing Company, New York (1953). The solution was reacted at 85–90° C. for about 4 hours to a Strokes cure of 136 seconds on a hot plate at 150° C. The unreacted formaldehyde, triethylamine and solvents were removed by distillation under vacuum at 70–80° C. The product was diluted to thirty-five percent solids with a mixture of equal parts of primary amyl alcohol and methyl isobutyl ketone. This material can be employed as a metal coating and baked at 300 to 400° F. for 8 to 15 minutes.

Example II

The condensation product from isano oil and phenol described in Example I was combined with a phenolic resole in such ratios as to comprise 10 to 40% by weight of the total amounts of solids. This material can be employed as a metal coating, and baked at 300–400° F. for 8 to 15 minutes.

Example III 100 grams of isano oil were combined with 94 grams of phenol and 20 grams of anhydrous zinc chloride. The mixture was heated, with stirring, for five hours at 160 degrees C. The brown product was washed three times with equal volumes of 5 percent ammonium hydroxide; and dehydrated by adding 150 milliliters of butanol and distilling under vacuo to remove the water azeotropically. The purified product was hydrogenated at 150 to 200 pounds per square inch pressure in an autoclave, with finely divided nickel as catalyst: the commercial catalyst known as Raney Ni was satisfactory. Ethyl alcohol was employed as a solvent during the hydrogenation; and was allowed to evaporate away when the hydrogen atmosphere was allowed to escape by opening to atmosphere after eight hours of the pressure hydrogenation. The hydrogenated product was mixed with three moles of formaldehyde (90 grams) and ¼ mole of triethylamine (about 25 grams), and heated at 80° C. until the gel time of the product was 100 seconds at 150 degrees C. on a Stroke gel tester. The resole formed was taken up in an organic solvent, and employed as a metal coating, thereafter being baked at 300 to 400 degrees F. for 8 to 15 minutes.

Example IV

The product of condensing isano oil and phenol as in Example I, after washing, was dissolved in chloroform. Chlorine gas was bubbled through the solution, at room temperature, for six hours. The chlorinated product was washed with water, stripped of chloroform, mixed with 2½ moles of formaldehyde (75 grams) and ½ mole of triethylamine (about 50 grams), and heated for 6 hours at 80 degrees C. to a Stroke cure rating of 75 seconds at 150 degrees C. The adduct was dissolved in an organic solvent, and employed as a metal coating with baking as in Example I.

Example V

The product of Example I may be treated as in Example IV, but with bubbling of dry hydrogen chloride, at room temperature, for six hours. The hydrochlorinated product was heated with formaldehyde and triethylamine, as before; dissolved in an organic solvent, and employed as metal coating with baking.

In general, valuable phenol:isano oil condensates may be prepared by heating mixtures thereof in the ratios of one to 2½ moles of phenol per mole of isanic or isanolic acids present, at temperatures of 140 to 200 degrees C. for periods effective to cause condensation of substantially all the phenol onto the acid radicals, e.g. five hours at 160–165 degrees C. Phenols other than monohydroxybenzene can be employed, of the structures employed for phenol:formaldehyde condensation to resoles.

Anhydrous zinc chloride is illustrative of condensing agents which promote the coupling. The zinc chloride may be replaced by zinc naphthenate, zinc formate or zinc maleate. The corresponding tin, cadmium, and antimony salts may be employed. The quantity of catalyst can be varied from 2 to 30% by weight of the oil and phenol, depending inversely upon the acidity. In general, 8 to 10 percent by weight is effective.

The temperature of reaction should be between 140 and 200 degrees C. The reaction is satisfactory with a minimum time of two hours and a maximum of eight hours, at 160 degrees C. The higher temperatures, e.g. 180 to 185 degrees C. can be employed to shorten the total time.

An article is illustrated in the drawing as comprising a metal base or substrate 10, for example of tin plate, having thereon a baked coating film 11 of the instant type, the relative dimensions of thickness being exaggerated for clearness.

The invention is not limited to the specific examples shown, and can be employed in many ways within the scope of the appended claims.

What is claimed is:

1. The method of preparing adduct phenol compounds competent of reacting with aldehyde to form phenol: aldehyde complexes, which comprise heating isano oil with a phenol in the proportion of one to 2½ moles of said phenol per one mole of the acid components of said oil at a temperature of 140 to 200 degrees C., whereby to effect addition of phenol groups with the said acid components, and thereafter reacting the coupled compounds with a substance selected from the class consisting of hydrogen, halogens and hydrohalogens, said heating step being conducted in the presence of one of the catalyst salts from the class consisting of zinc naphthenate, zinc formate, zinc maleate, tin naphthenate, tin formate, tin maleate, cadmium naphthenate, cadmium formate and cadmium maleate.

2. The method of preparing adduct phenol compounds competent of reacting with aldehyde to form phenol: aldehyde complexes, which comprise heating isano oil with a phenol in the proportion of one to 2½ moles of said phenol per one mole of the acid components of said oil at a temperature of 140 to 200 degrees C., whereby to effect addition of phenol groups with the said acid components, and thereafter reacting the coupled compounds with a substance selected from the class consisting of hydrogen, halogens and hydrohalogens, said heating step being conducted in the presence of zinc chloride.

3. The method of preparing a phenol: aldehyde resole resin, which comprises heating isano oil with a phenol in the proportion of one to 2½ moles of said phenol per one mole of the acid components of said oil at a temperature of 140 to 200 degrees C. in the presence of zinc chloride in the amount of 2 to 30 percent by weight of the oil and phenol, for 2 to 8 hours, whereby to effect addition of phenol groups at the acetylenic bonds of the acid components of said oil, thereafter reacting the adduct compounds with a substance selected from the class consisting of hydrogen, halogens and hydrohalogens, thereafter mixing with formaldehyde and tertiary amine, and heating until a resole is formed with a gel time (Stroke, 150 degrees C.) of at least 75 seconds.

4. The method of preparing a phenol-aldehyde resole resin, which comprises heating isano oil with a phenol in the proportion of one to 2½ moles of said phenol per one mole of the acid components of said oil at a temperature of 140 to 200 degrees C., whereby to effect addition of phenol groups at the acetylenic bonds of the acid components of said oil, thereafter reacting the coupled compounds with a substance selected from the class consisting of hydrogen, halogens and hydrohalogens, thereafter mixing with formaldehyde and tertiary amine, and heating until a resole is formed with a gel time (Stroke, 150 degrees C.) of at least 75 seconds, said heating step of isano with phenol being conducted in the presence of zinc chloride.

5. The method of preparing a phenol-aldehyde resole resin, which comprises heating isano oil with a phenol in the proportion of one to 2½ moles of said phenol per one mole of the acid components of said oil at a temperature of 140 to 200 degrees C., whereby to effect addition of phenol groups at the acetylenic bonds of the acid components of said oil, thereafter reacting the coupled compounds with a substance selected from the class consisting of hydrogen, halogens and hydrohalogens, thereafter mixing with formaldehyde and tertiary amine, and heating until a resole is formed with a gel time (Stroke, 150 degrees C.) of at least 75 seconds, said heating step of isano oil with phenol being conducted in the presence of at least one of the catalyst salts selected from the class consisting of zinc naphthenate, zinc formate, zinc maleate, tin naphthenate, tin formate, tin maleate, cadmium naphthenate, cadmium formate and cadmium maleate.

References Cited

UNITED STATES PATENTS

| | | | |
|---|---|---|---|
| 2,114,121 | 2/1938 | Bender | 260—398 |
| 2,154,969 | 4/1939 | Bender | 260—19 |
| 2,242,489 | 5/1941 | Turkington | 260—19 |
| 2,563,614 | 8/1951 | Palmer | 260—19 |
| 2,568,119 | 9/1951 | De Groote et al. | 260—19 |
| 2,623,891 | 12/1952 | Hermann | 260—19 |
| 2,938,458 | 5/1953 | Wheeler | 260—19 |
| 3,053,807 | 9/1962 | Lederman et al | 260—19 |

FOREIGN PATENTS 387,125  2/1933  Great Britain.

OTHER REFERENCES

Kneeland et al.: Journal of American Oil Chemists' Society, vol. 35, No. 7, 1958, pp. 361-3.

Chatfield: Varnish Constituents, Leonard Hill Limited, London, 1953, 868, pp. 302-304 relied upon.

DONALD E. CZAJA, *Primary Examiner.*

L. J. BERCOVITZ, *Examiner.*

R. W. GRIFFIN, C. W. IVY, *Assistant Examiners.*